(12) United States Patent
Leach et al.

(10) Patent No.: US 12,527,314 B2
(45) Date of Patent: Jan. 20, 2026

(54) PLATFORM ASSEMBLY FOR ATTACHMENT TO A TREE

(71) Applicant: Latitude Outdoors, LLC, Grand Rapids, MI (US)

(72) Inventors: Kevin Leach, Grand Rapids, MI (US); Alex Chopp, Royal Oak, MI (US); Jake Matelic, Royal Oak, MI (US)

(73) Assignee: Latitude Outdoors, LLC, Grand Rapids, MI (US)

( * ) Notice: Subject to any disclaimer, the term of this patent is extended or adjusted under 35 U.S.C. 154(b) by 309 days.

(21) Appl. No.: 18/175,969

(22) Filed: Feb. 28, 2023

(65) Prior Publication Data

US 2024/0057585 A1 Feb. 22, 2024

Related U.S. Application Data

(63) Continuation-in-part of application No. 17/821,262, filed on Aug. 22, 2022, now Pat. No. 11,602,213.

(51) Int. Cl.
A01M 31/02 (2006.01)

(52) U.S. Cl.
CPC .................................. A01M 31/02 (2013.01)

(58) Field of Classification Search
CPC ......... A01M 31/02; A45F 3/26; F16M 13/022
USPC .......................................................... 414/23
See application file for complete search history.

(56) References Cited

U.S. PATENT DOCUMENTS

| 3,487,518 | A | 1/1970 | Hopfeld |
| 4,371,055 | A | 2/1983 | Ashton et al. |
| 4,376,470 | A | 3/1983 | Ashton |
| 4,601,364 | A | 7/1986 | York |
| 4,869,520 | A | 9/1989 | Cole |
| 5,060,756 | A | 10/1991 | D'Acquisto |
| 5,109,954 | A | 5/1992 | Skyba |
| 5,156,234 | A | 10/1992 | Mccallum et al. |
| 5,806,626 | A | 9/1998 | Jenkins, Jr. |
| 5,816,362 | A | 10/1998 | Jenkins, Jr. |
| 5,954,157 | A | 9/1999 | Grimes et al. |
| 5,979,603 | A | 11/1999 | Woller |
| 6,267,202 | B1 | 7/2001 | Nelson |
| 6,547,035 | B1 | 4/2003 | D'Acquisto |
| 6,568,505 | B1 | 5/2003 | D'Acquisto |
| 7,434,662 | B2 | 10/2008 | Mcfall et al. |
| 7,926,775 | B1 | 4/2011 | Milazzo et al. |
| 8,230,972 | B2 * | 7/2012 | Johnson ................ A01M 31/02 182/187 |
| 8,292,033 | B2 | 10/2012 | Hale |
| 8,789,653 | B2 | 7/2014 | Priest |
| D719,680 | S | 12/2014 | Priest |
| 8,997,933 | B2 | 4/2015 | Furseth et al. |

(Continued)

OTHER PUBLICATIONS

Lone Wolf Portable Tree Stands, "The Fix Platform", Lone Wolf Custom Gear, Review dated Jul. 12, 2022, https://www.lonewolfcustomgear.com/products/the-fix?srsltid=AfmBOorjWEmHfXYhLHDF_5G6jjiNLci1Pjh_3QaBEenUmIUqlc7qk81_.

Primary Examiner — Todd M Epps
(74) Attorney, Agent, or Firm — Willard Quinn PLLC

(57) ABSTRACT

A platform assembly for attachment to a tree includes a platform, an integrally formed post coupled to the platform and operable to pivot relative to the platform about a pivot axis, and a standoff extending outward from the post proximate to the first end. The post extends from a first end to a second end along a length of the post that is substantially perpendicular to the pivot axis.

19 Claims, 10 Drawing Sheets

(56) References Cited

U.S. PATENT DOCUMENTS

| | | |
|---|---|---|
| 9,027,709 B2 | 5/2015 | Wheelington |
| 9,204,628 B2 | 12/2015 | Priest |
| D760,916 S | 7/2016 | Schlipf |
| D762,139 S | 7/2016 | Wheelington |
| 9,611,692 B1 | 4/2017 | Rogers |
| D872,308 S | 1/2020 | Hand |
| 10,791,729 B1* | 10/2020 | Power, II ............... F16M 13/02 |
| 10,926,489 B2 | 2/2021 | Davidson et al. |
| 10,973,224 B2 | 4/2021 | Infalt et al. |
| 11,154,048 B2 | 10/2021 | Power, II |
| 11,198,038 B1 | 12/2021 | Power, II et al. |
| 11,317,622 B2* | 5/2022 | Power, II ............... A01M 31/02 |
| 11,330,813 B2* | 5/2022 | Power, II ............... F16M 13/02 |
| 11,602,213 B1* | 3/2023 | Leach ................... A01M 31/02 |
| 2004/0216952 A1 | 11/2004 | Woller |
| 2006/0032705 A1 | 2/2006 | Isham et al. |
| 2006/0054397 A1 | 3/2006 | Pringnitz |
| 2007/0000726 A1 | 1/2007 | Berkbuegler |
| 2007/0205053 A1 | 9/2007 | Isham |
| 2010/0299108 A1 | 11/2010 | Glaser et al. |
| 2010/0300808 A1 | 12/2010 | Hale |
| 2012/0125715 A1 | 5/2012 | Furseth et al. |
| 2018/0073298 A1 | 3/2018 | Hand |
| 2018/0192634 A1 | 7/2018 | Check |
| 2021/0204538 A1* | 7/2021 | Power, II ............... A01M 31/02 |
| 2021/0227819 A1 | 7/2021 | Infalt et al. |
| 2021/0283467 A1 | 9/2021 | Booth |
| 2022/0305344 A1 | 9/2022 | Power, II et al. |

\* cited by examiner

PLATFORM ASSEMBLY FOR ATTACHMENT TO A TREE

CROSS-REFERENCE TO RELATED APPLICATION

This patent application is a continuation-in-part that claims priority to and the benefit under 35 U.S.C. § 120 of U.S. patent application Ser. No. 17/821,262, now U.S. Pat. No. 11,602,213, filed on Aug. 22, 2022, the disclosure of which is incorporated herein by reference in its entirety.

FIELD OF THE DISCLOSURE

The present disclosure generally relates to a platform assembly for attachment to a tree. More specifically, the present disclosure relates to a platform assembly having a post.

BACKGROUND OF THE DISCLOSURE

Tree stand platforms are often used for hunting.

SUMMARY OF THE DISCLOSURE

According to an aspect of the present disclosure, a platform assembly for attachment to a tree includes a platform, an integrally formed post coupled to the platform and operable to pivot relative to the platform about a pivot axis, and a standoff extending outward from the post proximate to the first end. The post extends from a first end to a second end along a length of the post that is substantially perpendicular to the pivot axis.

According to another aspect of the present disclosure, a one-piece post of a platform assembly for attachment to a tree includes a first end, a second end opposite the first end, such that a length of said post extends from the first end to the second end, a front face positioned between the first and second ends, and at least one hook that extends outward from the front face and defines at least one receiving recess configured to receive a rope therein.

According to yet another aspect of the present disclosure, a platform assembly for attachment to a tree includes a platform, a one-piece post coupled to the platform and operable to pivot relative to the platform about a pivot axis, and a standoff extending outward from the post proximate to the first end. The one-piece post includes a first end, a second end opposite the first end, such that a length of said post extends from the first end to the second end, a front face positioned between the first and second ends, and at least one hook that extends outward from the front face and defines at least one receiving recess configured to receive a rope therein.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 3:
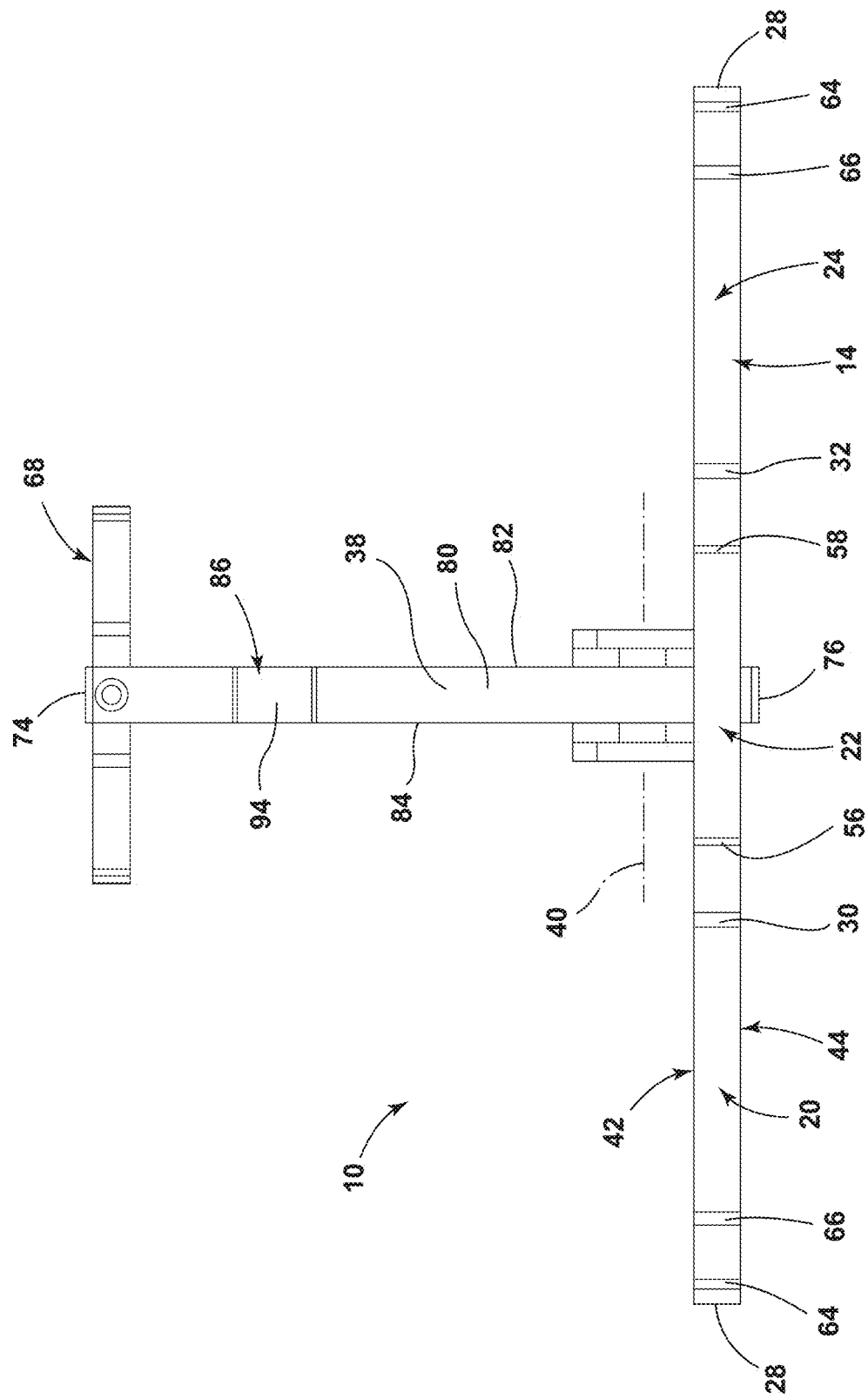
FIG. 3 is a front elevational view of the platform assembly, illustrating a front portion of the outer perimeter and first and second wing portions of the outer perimeter.

For purposes of description herein, the terms "upper," "lower," "right," "left," "lateral," "rear," "front," "vertical," "horizontal," "upward," "downward" and derivatives thereof shall relate to the disclosure as oriented in FIG. 3. Unless stated otherwise, the term "front" shall refer to closer to an intended viewer, and the term "rear" shall refer to further from the intended viewer. Unless stated otherwise, the term "forward" shall refer to toward the intended viewer and/or closer to the intended viewer based on the context. For example, the phrase "extending forward" shall be interpreted as extending toward the intended viewer, while a first element being "forward of" a second element shall refer to the first element being closer than the second element to the intended viewer. Unless stated otherwise, the term "rearward" shall refer to away from the intended viewer and/or further from the intended viewer based on the context. For example, the phrase "extending rearward" shall be interpreted as extending away from the intended viewer, while a first element being "rearward of" a second element shall refer to the first element being further than the second element from the intended viewer. Unless stated otherwise, the term "lateral" and derivatives thereof shall refer to left-right directions. Further, unless stated otherwise, the term "horizontal" shall refer to forward, rearward, left, right, and/or combinations thereof. However, it is to be understood that the disclosure may assume various alternative orientations, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a platform assembly 10 for attachment to a tree includes a platform 12. The platform 12 includes an outer perimeter 14. The outer perimeter 14 bounds an interior structure 16 of the platform 12 that is horizontally-inboard of the outer perimeter 14. The outer perimeter 14 includes a rear portion 18, a first wing portion 20, a front portion 22, and a second wing portion 24. The first wing portion 20 is coupled to the rear portion 18 at a first wing portion rear corner 26. The first wing portion 20 includes an outboard-most portion 28 of the outer perimeter 14 in a first lateral direction. The front portion 22 is coupled to the first wing portion 20 at a first wing portion front corner 30. The second wing portion 24 is coupled to the front portion 22 at a second wing portion front corner 32 and is coupled to the rear portion 18 at a second wing portion rear corner 34. The second wing portion 24 includes an outboard-most portion 28 of the outer perimeter 14 in a second lateral direction that is opposite the first lateral direction. The first wing portion 20 includes a rear section 36 that extends from the first wing portion rear corner 26 to the outboard-most portion 28 of the outer perimeter 14 in the first lateral direction. A post 38 is coupled to the platform 12 and is operable to pivot relative to the platform 12 about a pivot axis 40. The pivot axis 40 is parallel to the first and second lateral directions. At least a majority of the rear section 36 is positioned forward of the pivot axis 40.

Figure 1:
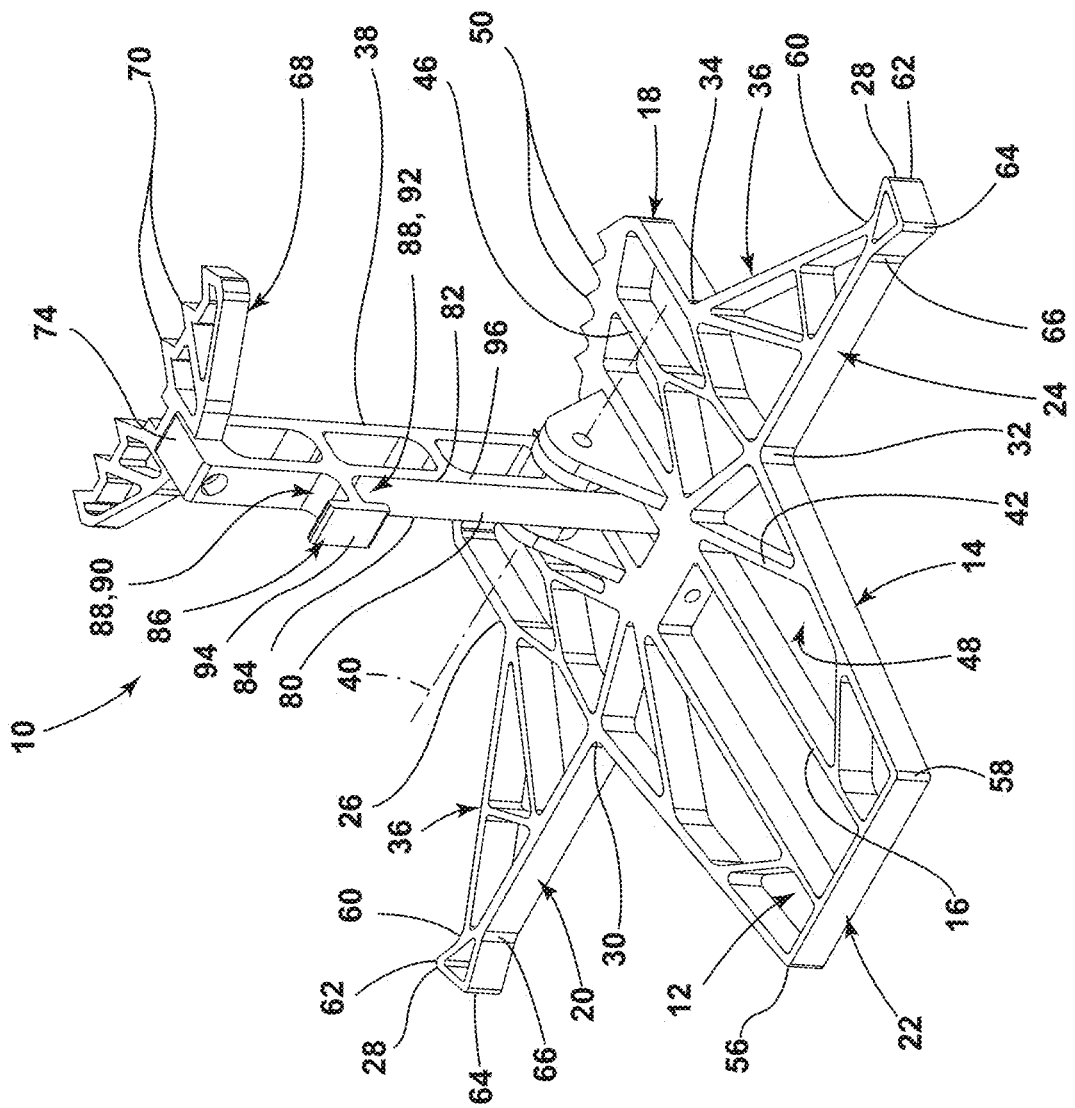
FIG. 1 is a top perspective view of a platform assembly that includes a platform having an outer perimeter and a post pivotably coupled to the platform and in a deployed position.
Figure 4:
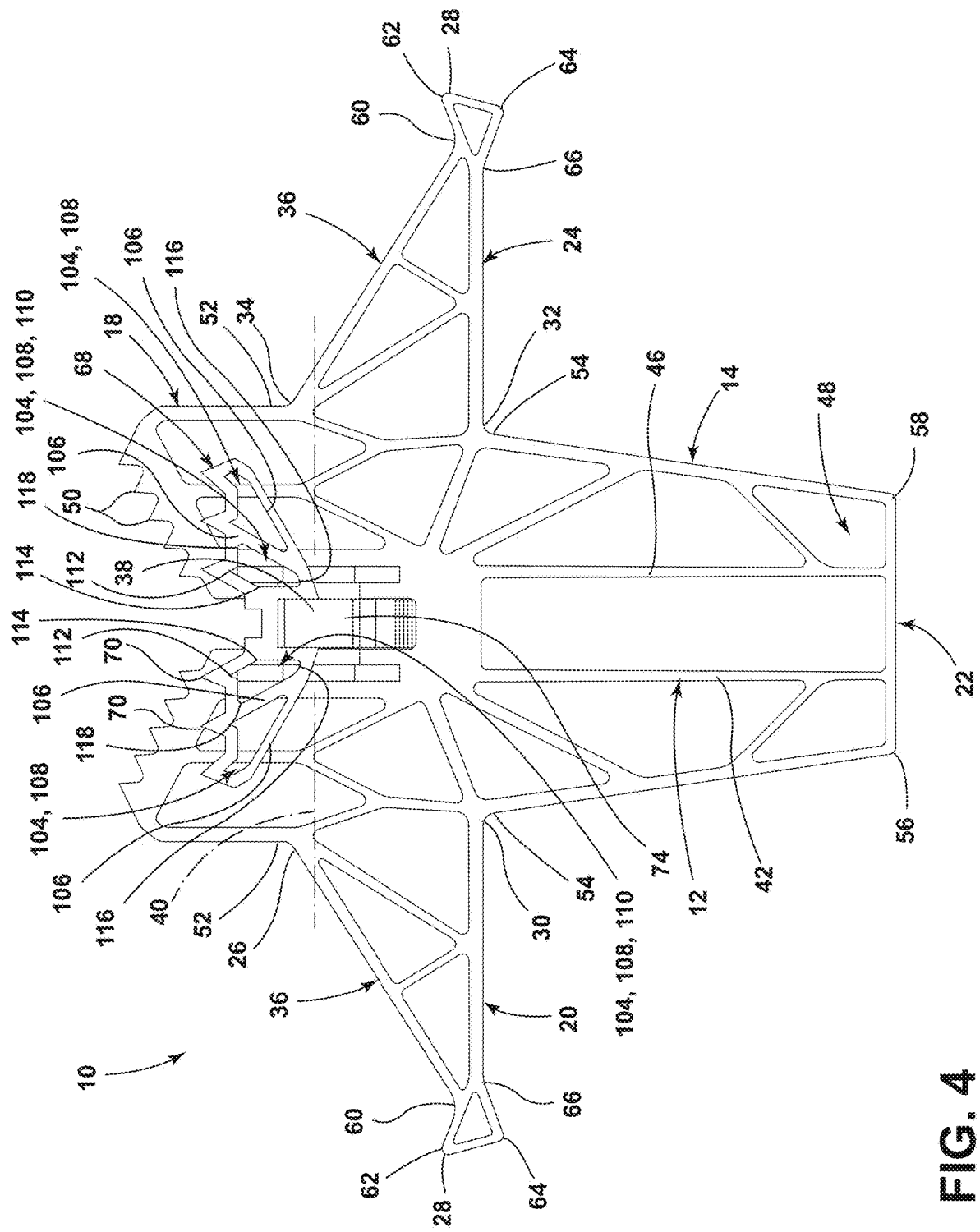
FIG. 4 is a plan view of the platform assembly, illustrating the outer perimeter of the platform which includes the front portion, the first wing portion, the second wing portion, and a rear portion.

Referring now to FIGS. 1, 3, and 4, the platform assembly 10 includes the platform 12. The platform 12 includes the outer perimeter 14 and the interior structure 16. As illustrated in FIGS. 1 and 4, the interior structure 16 of the platform 12 is horizontally-inboard of the outer perimeter 14, and the outer perimeter 14 bounds the interior structure 16. As illustrated in FIGS. 1 and 4, the outer perimeter 14 faces horizontally outward away from the interior structure 16. In various implementations, the interior structure 16 forms an upper support portion 42 of the platform 12 that is configured to support a user standing on the upper support portion 42 of the platform 12. The interior structure 16 of the platform 12 further includes an underside portion 44 that is opposite the upper support portion 42. As illustrated in FIG. 3, the outer perimeter 14 extends between the upper support portion 42 and the underside portion 44 of the platform 12. In the embodiment illustrated in FIGS. 1 and 4, the interior structure 16 of the platform 12 includes a plurality of cross members 46 that cooperate to define a plurality of apertures 48 and form the upper support portion 42 and underside portion 44 of the platform 12. It is contemplated that the interior structure 16 of the platform 12 can be configured in a variety of ways, in various implementations. For example, in some embodiments, the interior structure 16 of the platform 12 can be a solid panel that does not define apertures.

Referring now to FIGS. 1-4, the outer perimeter 14 includes the rear portion 18, the first wing portion 20, the front portion 22, and the second wing portion 24. As illustrated in FIG. 4, the first wing portion 20 is coupled to the rear portion 18 at the first wing portion rear corner 26, the front portion 22 is coupled to the first wing portion 20 at the first wing portion front corner 30, and the second wing portion 24 is coupled to the front portion 22 at the second wing portion front corner 32 and is coupled to the rear portion 18 at the second wing portion rear corner 34. In the embodiment illustrated in FIGS. 1-4, the first wing portion front corner 30 is a reentrant corner and the first wing portion rear corner 26 is a reentrant corner. A reentrant corner of the outer perimeter 14 can be concave. In other words, a reentrant corner of the outer perimeter 14 can be a rounded reentrant corner. Further, a salient corner of the outer perimeter 14 can be a convex corner. In other words, a salient corner of the outer perimeter 14 can be a rounded salient corner, in some implementations. As further illustrated in FIG. 4, the second wing portion front corner 32 and the second wing portion rear corner 34 can be reentrant corners.

Referring now to FIG. 4, the rear portion 18 of the outer perimeter 14 extends from the first wing portion rear corner 26 to the second wing portion rear corner 34. The rear portion 18 of the outer perimeter 14 forms a plurality of rearwardly extending teeth 50 that are configured to engage the tree to which the platform assembly 10 is mounted. As illustrated in FIG. 4, an outboard-most portion 52 of the rear portion 18 of the outer perimeter 14 in the first lateral direction is immediately adjacent to the first wing portion rear corner 26. Further, the outboard-most portion 52 of the rear portion 18 of the outer perimeter 14 in the second lateral direction that is opposite the first lateral direction is immediately adjacent to the second wing portion rear corner 34. In the embodiment illustrated in FIG. 4, the first lateral direction corresponds with the horizontally left direction and the second lateral direction corresponds with the horizontally right direction. It is contemplated that the first lateral direction can correspond with the horizontally right direction and the second lateral direction can correspond with the horizontally left direction, in some implementations.

Referring still to FIG. 4, an outboard-most portion 54 of the front portion 22 of the outer perimeter 14 in the first lateral direction can be immediately adjacent to the first wing portion front corner 30. Further, the outboard-most portion 54 of the front portion 22 of the outer perimeter 14 in the second lateral direction can be immediately adjacent to the second wing portion front corner 32, as illustrated in FIG. 4. In the embodiment illustrated in FIG. 4, the front portion 22 of the outer perimeter 14 extends forward and laterally-inboard from the reentrant first wing portion front corner 30 to a first salient corner 56 of the front portion 22, laterally across in the second lateral direction to a second salient corner 58 of the front portion 22, and laterally outboard and rearward from the second salient corner 58 of the front portion 22 to the reentrant second wing portion front corner 32 of the outer perimeter 14. It is contemplated that the front portion 22 of the platform assembly 10 can have a variety of shapes and varying numbers of corners.

Referring still to FIG. 4, in various embodiments, the first wing portion 20 includes the outboard-most portion 28 of the outer perimeter 14 in the first lateral direction. Further, the second wing portion 24 includes the outboard-most portion 28 of the outer perimeter 14 in the second lateral direction. In various embodiments, the first wing portion 20 includes the rear section 36 that extends from the first wing portion rear corner 26 to the outboard-most portion 28 of the outer perimeter 14 in the first lateral direction. In other words, in the embodiment illustrated in FIG. 4, the rear section 36 of the first wing portion 20 extends from the first wing portion rear corner 26 to the leftward-most portion of the first wing portion 20. In various embodiments, the second wing portion 24 includes the rear section 36 that extends from the second wing portion rear corner 34 to the outboard-most portion 28 of the outer perimeter 14 in the second lateral direction. In some implementations, the rear section 36 of the first wing portion 20 forms a rear section corner 60 that is disposed between the outboard-most portion 28 of the outer perimeter 14 in the first lateral direction and the first wing portion rear corner 26. As illustrated in FIG. 4, the rear section corner 60 is a reentrant corner. In some implementations, the outboard-most portion 28 of the outer perimeter 14 in the first lateral direction is positioned rearward of the rear section corner 60 of the first wing portion 20. As further illustrated in FIG. 4, the rear section 36 of the second wing portion 24 forms a rear section corner 60 that is disposed between the outboard-most portion 28 of the outer perimeter 14 in the second lateral direction and the second wing portion rear corner 34. The rear section corner 60 of the second wing portion 24 is a reentrant corner. In some implementations, the outboard-most portion 28 of the outer perimeter 14 in the first lateral direction is nearer than the first wing portion rear corner 26 to the rear section corner 60 of the first wing portion 20 of the outer perimeter 14. Further, the outboard-most portion 28 of the outer perimeter 14 in the second lateral direction can be nearer than the second wing portion rear corner 34 to the rear section corner 60 of the second wing portion 24 of the outer perimeter 14.

In the embodiment illustrated in FIG. 4, the first wing portion 20 of the outer perimeter 14 extends from the reentrant first wing portion rear corner 26 forward and laterally-outboard to the reentrant rear section corner 60 of the first wing portion 20. The first wing portion 20 further extends from the reentrant rear section corner 60 laterally-outboard and rearward to a first salient corner 62 of the first wing portion 20 that forms the outboard-most portion 28 of the outer perimeter 14 in the first lateral direction. The first wing portion 20 extends from the first salient corner 62 of the first wing portion 20 forward and laterally-inboard to a second salient corner 64 of the first wing portion 20. The first wing portion 20 extends from the second salient corner 64 of the first wing portion 20 rearward and laterally-inboard to a front reentrant corner 66 of the first wing portion 20. The first wing portion 20 extends from the front reentrant corner 66 of the first wing portion 20 to the reentrant first wing portion front corner 30.

As further illustrated in FIG. 4, the second wing portion 24 of the outer perimeter 14 extends from the reentrant second wing portion rear corner 34 forward and laterally-outboard to the reentrant rear section corner 60 of the second wing portion 24. The second wing portion 24 further extends from the reentrant rear section corner 60 laterally-outboard and rearward to the first salient corner 62 of the second wing portion 24 that forms the outboard-most portion 28 of the outer perimeter 14 in the second lateral direction. The second wing portion 24 extends from the first salient corner 62 of the second wing portion 24 forward and laterally-inboard to the second salient corner 64 of the second wing portion 24. The first wing portion 20 extends from the second salient corner 64 of the second wing portion 24 rearward and laterally-inboard to the front reentrant corner 66 of the second wing portion 24. The second wing portion 24 extends from the front reentrant corner 66 of the second wing portion 24 to the reentrant second wing portion front corner 32.

Referring still to FIG. 4, the outboard-most portion 28 of the outer perimeter 14 in the first lateral direction can be a first distance from the outboard-most portion 28 of the outer perimeter 14 in the second lateral direction, and the outboard-most portion 54 of the front portion 22 of the outer perimeter 14 in the first lateral direction can be a second distance from the outboard-most portion 54 of the front portion 22 of the outer perimeter 14 in the second lateral direction. As illustrated in FIG. 4, the first distance is greater than the second distance. In various implementations, the first distance is at least twice as long as the second distance. In various implementations, the outboard-most portion 52 of the rear portion 18 of the outer perimeter 14 in the first lateral direction can be a third distance from the outboard-most portion 52 of the rear portion 18 of the outer perimeter 14 in the second lateral direction. As illustrated in FIG. 4, the first distance is greater than the third distance. In various implementations, the first distance can be at least twice as long as the third distance. In the embodiment illustrated in FIG. 4, the third distance is greater than the second distance.

Figure 2:
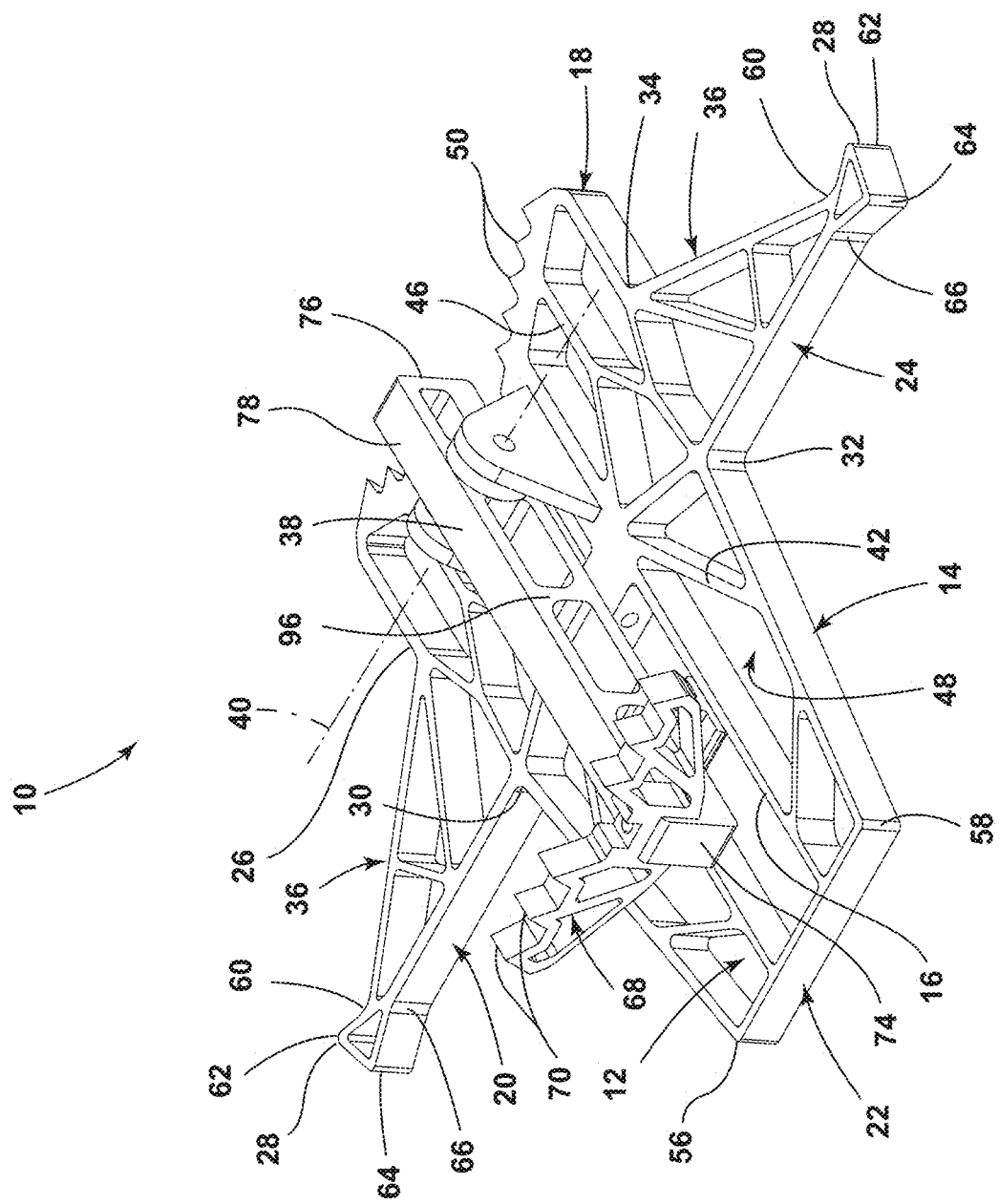
FIG. 2 is a top perspective view of the platform assembly, illustrating the platform and the post in a stowed position.
Figure 5:
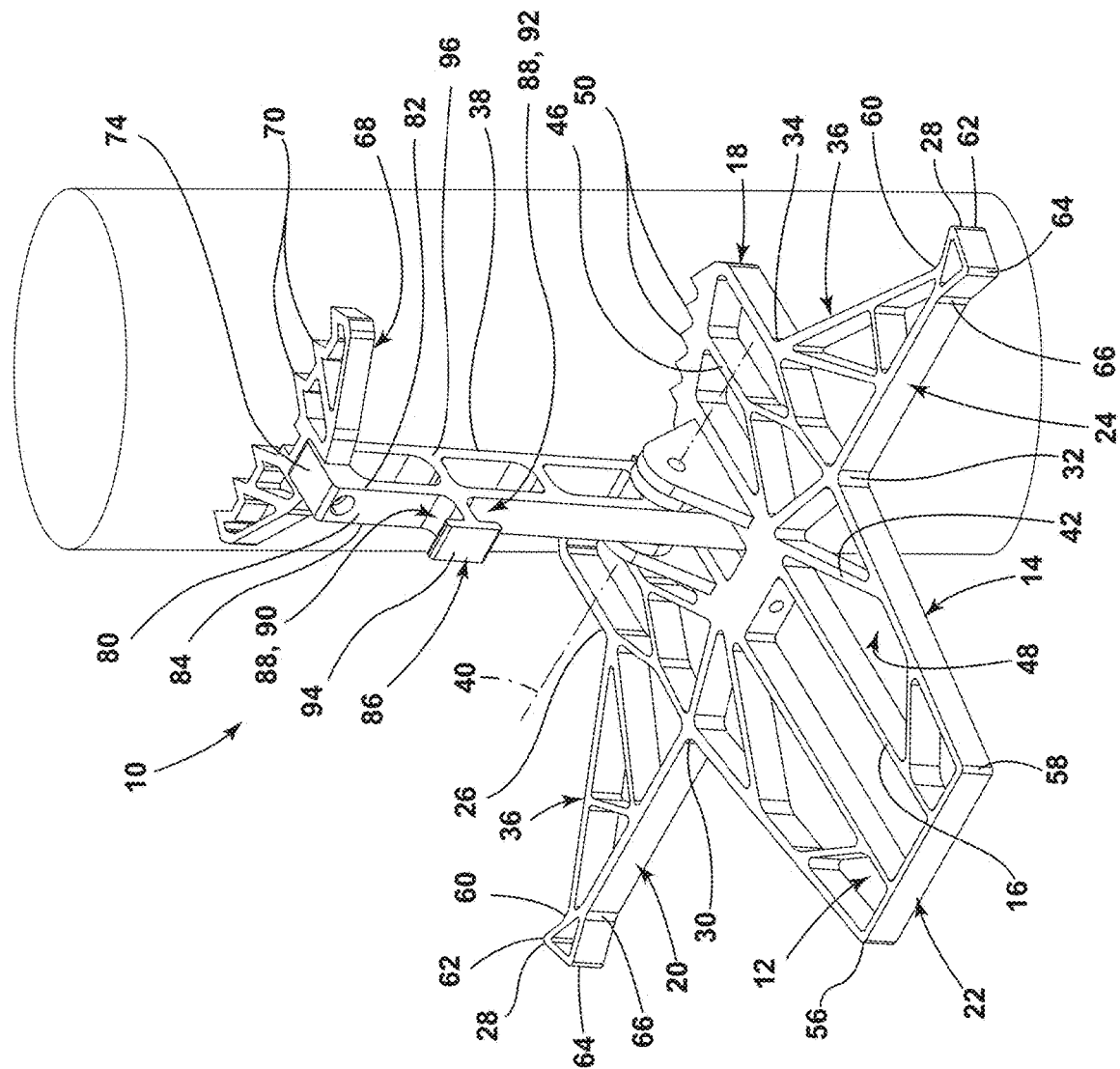
FIG. 5 is a top perspective view of the platform assembly, illustrating the platform assembly coupled to a tree.
Figure 6:
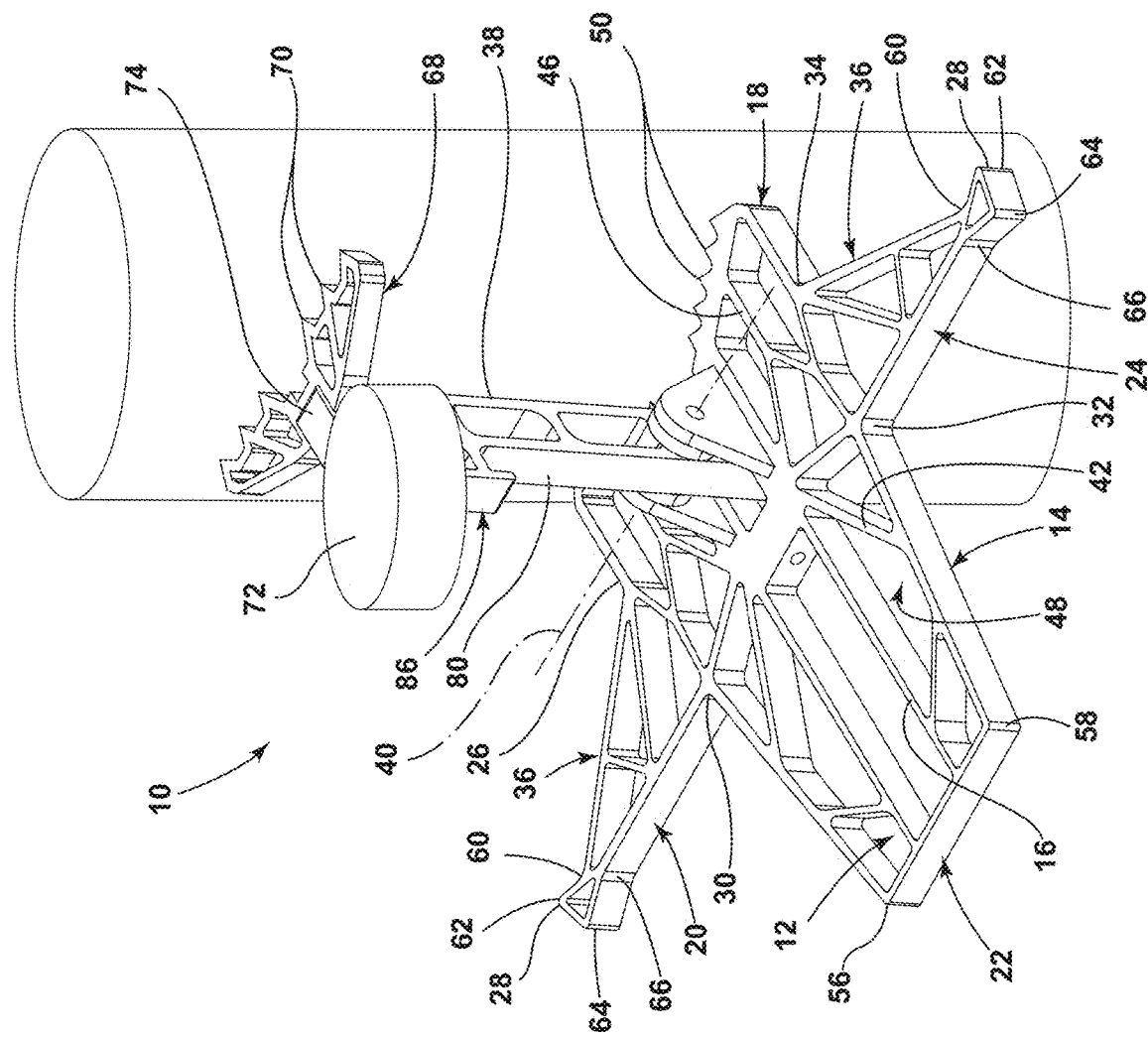
FIG. 6 is a top perspective view of the platform assembly including a seat coupled to the post, wherein the platform assembly is coupled to a tree.
Figure 7:
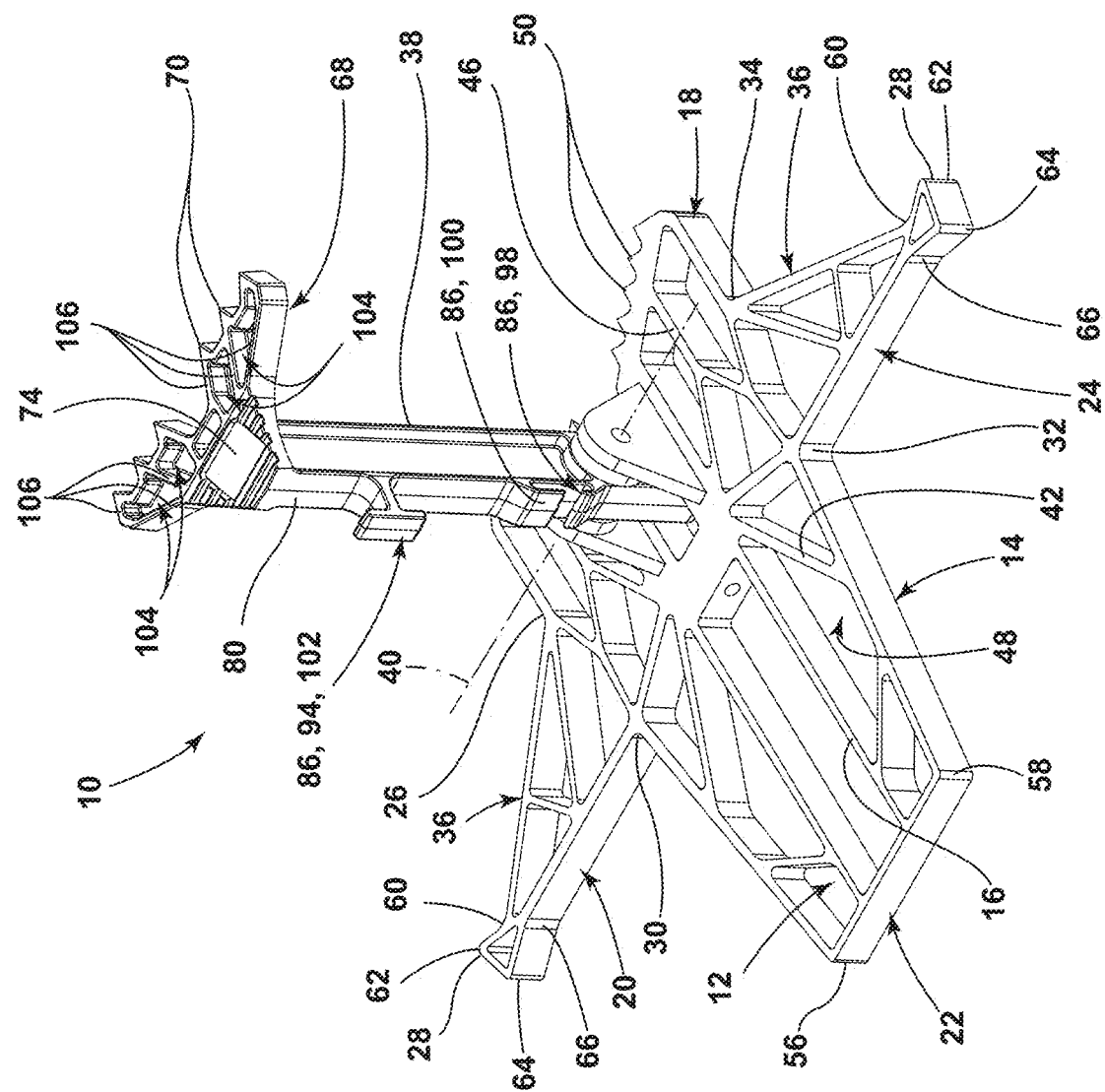
FIG. 7 is a top perspective view of a platform assembly that includes a platform and a post pivotably coupled to the platform.

Referring now to FIGS. 1-6, the platform assembly 10 can include the post 38. The post 38 is coupled to the platform 12 and is operable to pivot relative to the platform 12 about the pivot axis 40. In the embodiment illustrated in FIGS. 1-4, the pivot axis 40 is parallel to the first and second lateral directions. In various embodiments, the post 38 is operable to pivot relative to the platform 12 about the pivot axis 40 between a deployed position, as illustrated in FIGS. 1 and 3-6, and a stowed position, as illustrated in FIG. 2. In various implementations, a standoff 68 is coupled to the post 38. The standoff 68 can include a plurality of standoff teeth 70 that are configured to engage the tree in the deployed position of the post 38, as illustrated in FIGS. 5 and 6. As illustrated in FIG. 6, in some embodiments, a seat 72 can be coupled to the post 38. The seat 72 can support a seated user, while the platform 12 provides support for the feet of the seated user.

Referring now to FIGS. 1-4, in various implementations, at least a majority of the rear section 36 of the first wing portion 20 of the outer perimeter 14 is positioned forward of the pivot axis 40. Further, at least a majority of the rear section 36 of the second wing portion 24 can be positioned forward of the pivot axis 40. In some implementations, the entirety of the rear section 36 of the first wing portion 20 and/or the entirety of the rear section 36 of the second wing portion 24 is positioned forward of the pivot axis 40. In the embodiment illustrated in FIG. 4, a majority of the rear section 36 of the first wing portion 20 of the outer perimeter 14 is positioned forward of the pivot axis 40, and a portion of the rear section 36 of the first wing portion 20 is positioned rearward of the pivot axis 40. Further, a majority of the rear section 36 of the second wing portion 24 of the outer perimeter 14 is positioned forward of the pivot axis 40, and a portion of the rear section 36 of the second wing portion 24 is positioned rearward of the pivot axis 40. In the illustrated embodiment, the first wing portion rear corner 26 and the second wing portion rear corner 34 are positioned rearward of the pivot axis 40 about which the post 38 pivots between the deployed and stowed positions.

In operation of an exemplary embodiment of the platform assembly 10, a user mounts the platform assembly 10 to a tree with the post 38 in the deployed position, as illustrated in FIG. 5. Next, the user secures himself to the tree with a safety harness and steps onto the platform 12. Next, the user, while securely tethered to the tree via the safety harness, steps out onto the first wing portion 20 of the outer perimeter 14 to gain a better vantage point of the areas rearward of the tree.

The platform assembly 10 of the present disclosure can provide a variety of advantages. First, the first and second wing portions 20, 24 of the outer perimeter 14 can provide footholds for a user supported by the platform assembly 10 that increase the lateral mobility of the user on the platform 12. Second, the majority of the rear sections 36 of the first and second wing portions 20, 24 being positioned forward of the pivot axis 40 can ensure that the platform 12 does not undesirably pivot relative to the post 38 during use.

Referring now to FIGS. 1-11, the platform assembly 10 includes the post 38. In various implementations, the post 38 can be a one-piece post 38 and/or an integrally formed post 38. For example, in the embodiment illustrated in FIGS. 1-5, the post 38 is a one-piece post 38. Further, the post 38 is illustrated as a one-piece, integrally formed post 38 in FIGS. 7-10. The post 38 may be formed of a variety of types of materials. For example, the post 38 may be made of one or more metals, such as aluminum. In some implementations, the post 38 may be formed of a fiber reinforced plastic, such a thermoplastic resin, as described further herein. The post 38 may be integrally formed in a variety of manners (e.g., cast, injection molded, three-dimensionally printed, etc.).

Referring now to FIGS. 1-10, the post 38 includes a first end 74 and a second end 76 opposite the first end 74. The post 38 extends from the first end 74 to the second end 76 along a length L of the post 38. The length L of the post 38 is substantially perpendicular to the pivot axis 40 about which the post 38 is configured to pivot relative to the platform 12 between the stowed and deployed positions. In some implementations, the first and second ends 74, 76 of the post 38 are vertically aligned in the stowed position of the post 38. For example, as illustrated in FIG. 2, wherein the post 38 is in the stowed position, the first and second ends 74, 76 of the post 38 are substantially vertically aligned with each other. In various implementations, the first end 74 of the post 38 is positioned upward of the second end 76 of the post 38 in the deployed position of the post 38. For example, as illustrated in FIG. 3, wherein the post 38 is in the deployed position and the platform assembly 10 is oriented in a use configuration, the first end 74 of the post 38 is positioned vertically above the second end 76 of the post 38, which is positioned below the platform 12. In the illustrated embodiment, the length L of the post 38 extends generally vertically in the deployed position and generally horizontally in the stowed position of the post 38.

Referring still to FIGS. 1-10, the post 38 of the platform assembly 10 includes a rear face 78 and a front face 80 opposite the rear face 78. In operation of the platform assembly 10, the rear face 78 of the post 38 faces toward the trunk of the tree that the platform assembly 10 is mounted to. As illustrated in FIG. 6, the front face 80, which is opposite the rear face 78, faces away from the trunk of the tree that the platform assembly 10 is mounted to. In the embodiment illustrated in FIG. 3, wherein the post 38 is in the deployed position, the front face 80 of the post 38 faces forward. The front face 80 of the post 38 has a lateral width. For example, in the embodiment illustrated in FIG. 3, the front face 80 of the post 38 is substantially planar and extends laterally from a first lateral edge 82 (e.g., right edge) to a second lateral edge 84 (e.g., left edge) opposite the first lateral edge 82, such that the distance from the first lateral edge 82 to the second lateral edge 84 defines the lateral width of the front face 80 of the post 38.

Referring still to FIGS. 1-10, the post 38 can include at least one hook 86. The at least one hook 86 can extend outward from the front face 80 of the post 38. The at least one hook 86 defines at least one receiving recess 88 configured to receive a rope (not shown) therein. It is to be understood that, as used herein, "rope" is not limited to a conventional braided rope, but rather can refer to at least one of a host of flexible rope-like items, which may include, but is not limited to, cord, rope, cable, tether, strap, belt, chain, and/or a combination thereof. In some implementations, the at least one receiving recess 88 defined by the at least one hook 86 faces generally toward the second end 76 of the post 38. In some implementations, the at least one receiving recess 88 defined by the at least one hook 86 faces generally toward the first end 74 of the post 38. In some implementations, the at least one receiving recess 88 defined by the at least one hook 86 includes a first receiving recess 90 that faces generally toward the first end 74 of the post 38 and a second receiving recess 92 that faces generally toward the second end 76 of the post 38. In various implementations, the first receiving recess 90 faces away from the second receiving recess 92.

Referring still to FIGS. 1-10, the at least one hook 86 can be integrally coupled with the front face 80 of the post 38. In other words, the at least one hook 86 is a portion of the one-piece post 38 rather than a distinct component that is configured to be selectively mounted to the post 38. In various implementations, the at least one hook 86 has a lateral width that is substantially the same as the lateral width of the front face 80 of the post 38. The at least one hook 86 may include a single protuberance 94 that extends outward from the front face 80 of the post 38 and/or may include a plurality of hooks, as described further herein.

Referring now to FIGS. 1 and 3, an exemplary embodiment of the post 38 that includes the at least one hook 86 is illustrated. In the illustrated embodiment, the at least one hook 86 is a single protuberance 94 that extends outward from the front face 80 of the post 38. As illustrated in FIG. 1, the at least one hook 86 is an integral portion of the one-piece post 38 and is flush and/or planar with a portion of a lateral side face 96 of the post 38 that meets the front face 80 of the post 38 at the first lateral edge 82. As illustrated in FIG. 3, the lateral width of the at least one hook 86 is equal to the lateral width of the front face 80 of the post 38. The at least one hook 86 is generally T-shaped having a first portion that extends forward from the front face 80 of the post 38 to a second portion that extends upward and downward from the first portion. The post 38, the first portion, and the second portion cooperate to define the at least one receiving recess 88. As illustrated in FIG. 1, the at least one receiving recess 88 includes the first receiving recess 90 and the second receiving recess 92. The first receiving recess 90 faces generally toward the first end 74 of the post 38, and the second receiving recess 92 faces generally toward the second end 76 of the post 38. As illustrated in FIG. 1, the first and second receiving recesses 90, 92 are spaced apart from each other along the length L of the post 38. Further, the first receiving recess 90 faces away from the second receiving recess 92.

As such, in the exemplary embodiment of the post 38 illustrated in FIGS. 1 and 3, the post 38 includes at least one hook 86 in the form of the T-shaped protuberance 94, and the at least one hook 86 (1) has a lateral width that is substantially equal to the lateral width of the front face 80 of the post 38, (2) is an integral portion of the one-piece post 38 and is flush and/or planar with a portion of the lateral side face 96 of the post 38 that meets the front face 80 of the post 38 at the first lateral edge 82, (3) defines at least one receiving recess 88 configured to receive a rope therein, (4) defines at least one receiving recess 88 that faces generally toward the first end 74 of the post 38, (5) defines at least one receiving recess 88 that faces generally toward the second end 76 of the post 38, and (6) defines a first receiving recess 90 that faces generally toward the first end 74 of the post 38 and a second receiving recess 92 that faces generally toward the second end 76 of the post 38.

Figure 8:
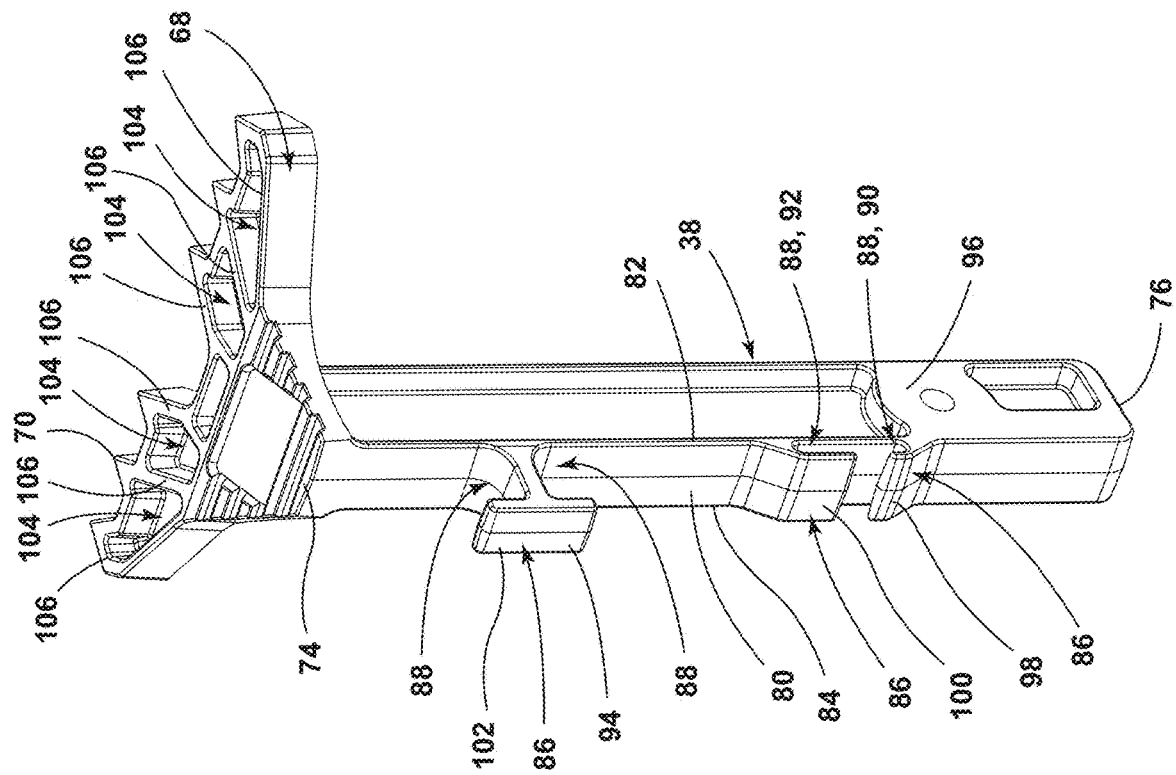
FIG. 8 is a top perspective view of a post of a platform assembly, illustrating at least one hook that defines at least one recess.
Figure 9:
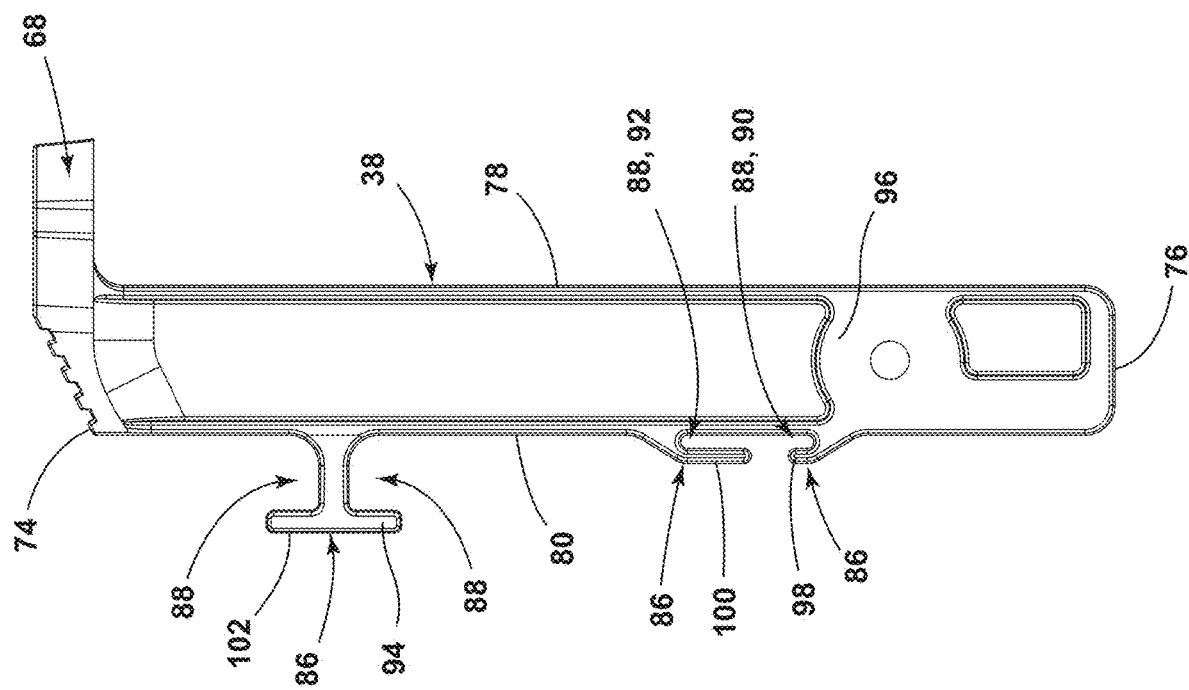
FIG. 9 is a side elevational view of the post of the platform assembly, illustrating the at least one hook.
Figure 10:
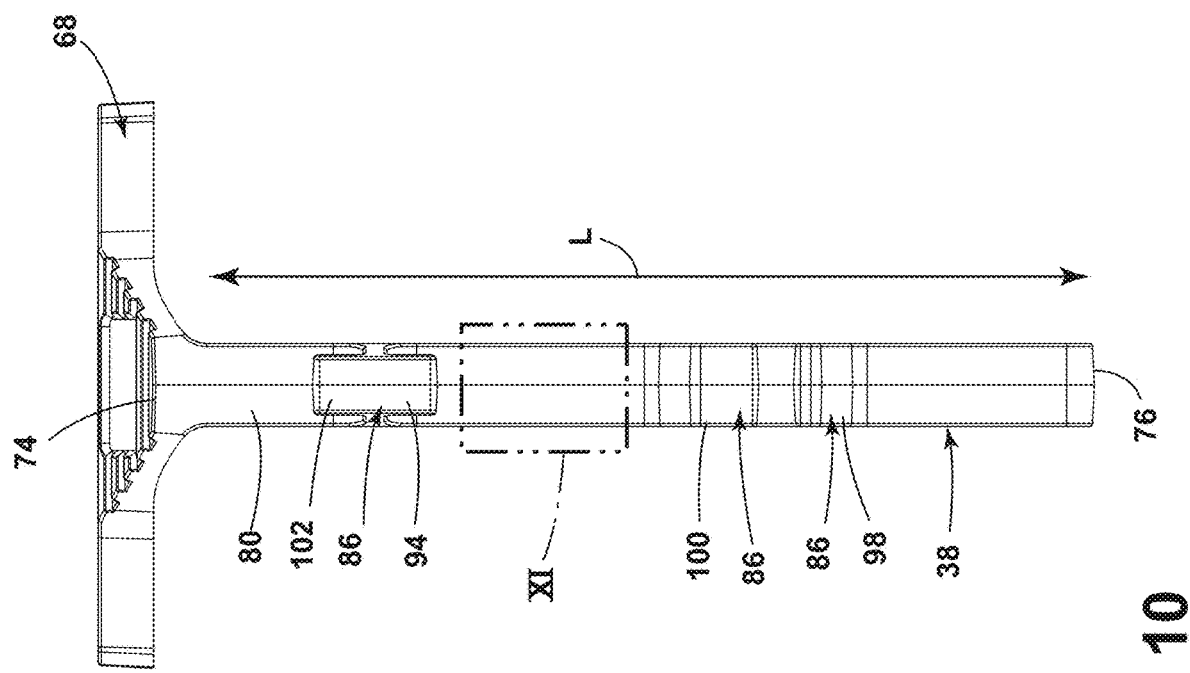
FIG. 10 is a front elevational view of the post of the platform assembly, illustrating the at least one hook extending outward from a front face of the post.

Referring now to FIGS. 7-10, an exemplary embodiment of the post 38 that includes the at least one hook 86 is illustrated. In the illustrated embodiment, the at least one hook 86 includes a plurality of hooks, and the at least one receiving recess 88 includes a plurality of receiving recesses. For example, as illustrated in FIGS. 8-10, the at least one hook 86 includes a first hook 98 and a second hook 100. The first hook 98 extends outward from the front face 80 of the post 38 and defines a first receiving recess 90 that faces generally toward the first end 74 of the post 38. The second hook 100 extends outward from the front face 80 of the post 38 and defines a second receiving recess 92 that faces generally toward the second end 76 of the post 38. The first and second receiving recesses 90, 92 are spaced apart from each other along the length L of the post 38. As illustrated in FIG. 10, the first and second hooks 98, 100 have lateral widths that are substantially equal to the lateral width of the front face 80 of the post 38. As shown in FIG. 8, the first and second hooks 98, 100 are integral portions of the one-piece post 38 and are flush and/or planar with a portion of the lateral side face 96 of the post 38 that meets the front face 80 of the post 38 at the first lateral edge 82.

As such, in the exemplary embodiment of the post 38 illustrated in FIGS. 7-10, the post 38 includes at least one hook 86 in the form of the first hook 98 and the second hook 100, and the at least one hook 86 (1) has a lateral width that is substantially equal to the lateral width of the front face 80 of the post 38, (2) is an integral portion of the one-piece post 38 and is flush and/or planar with a portion of the lateral side face 96 of the post 38 that meets the front face 80 of the post 38 at the first lateral edge 82, (3) defines at least one receiving recess 88 configured to receive a rope therein, (4) defines at least one receiving recess 88 that faces generally toward the first end 74 of the post 38, (5) defines at least one receiving recess 88 that faces generally toward the second end 76 of the post 38, and (6) defines a first receiving recess 90 that faces generally toward the first end 74 of the post 38 and a second receiving recess 92 that faces generally toward the second end 76 of the post 38. In addition to the first and second hooks 98, 100, the embodiment of the post 38 illustrated in FIGS. 7-10 includes a third hook 102 in the form of a T-shaped protuberance 94 similar to the T-shaped protuberance 94 illustrated in FIGS. 1 and 3. The first hook 98, the second hook 100, and the third T-shaped hook 102 may be utilized in operation of the platform assembly 10 to receive rope to allow the post 38 to be secured to an object, such as a tree, and/or to allow an object to be secured to the post 38. It is contemplated that the at least one hook 86 of the post 38 may include more or fewer hooks than the embodiment of the post 38 illustrated in FIGS. 7-10.

The platform assembly 10 further includes the standoff 68. In various implementations, the standoff 68 is coupled to the post 38. The standoff 68 includes the plurality of standoff teeth 70 that are configured to engage the tree in the deployed position of the post 38, as illustrated in FIGS. 5 and 6. The standoff 68 extends outward from the post 38 proximate to the first end 74 of the post 38, as illustrated in FIGS. 1-10. In some implementations, the standoff 68 and the post 38 are integrally coupled. For example, as illustrated in FIGS. 7-10, the post 38 and standoff 68 are portions of a one-piece component of the platform assembly 10.

Referring now to FIGS. 4, 5, and 8, the standoff 68 of the platform assembly 10 defines a plurality of standoff openings 104. The standoff openings 104 may be apertures 108, as illustrated in FIG. 4, and/or recesses, as illustrated in FIG. 8. The plurality of standoff openings 104 can be separated from each other and/or partially defined by a plurality of standoff walls 106, as illustrated in FIGS. 4, 5, and 8. At least one standoff wall 106 may extend generally rearward from a portion of the standoff 68 proximate to the first end 74 of the post 38 along a length of the at least one standoff wall 106. In some implementations, one or more standoff walls 106 may generally align with the standoff teeth 70, as illustrated in FIG. 4. In some embodiments, the length of the at least one standoff wall 106 may be substantially perpendicular to the length L of the post 38. In some implementations, the standoff 68 having a plurality of standoff openings 104 that are separated by and partially defined by standoff walls 106 may advantageously influence the flow of resin and the orientation of fibers 120 during injection molding of the standoff 68 and/or post 38, such that the structural integrity of the standoff 68 is enhanced. Further, the orientation of fibers 120 within the at least one standoff wall 106 may enhance the structural integrity of the standoff 68, as described further herein.

Referring now to FIG. 4, the standoff 68 defines a plurality of standoff openings 104 in the form of a plurality of apertures 108. The plurality of apertures 108 includes two apertures 108 that are the two laterally inboard-most apertures 110 defined by the standoff 68. As illustrated in FIG. 4, the outlines of the two laterally inboard-most apertures 110 mirror each other about a lateral centerline of the standoff 68. The outline of each aperture 108 includes a plurality of reentrant corners, namely, a rearward-most reentrant corner 112, an inboard-most reentrant corner 114, a forward-most reentrant corner 116, and an outboard-most reentrant corner 118. The rearward-most reentrant corner 112 is positioned between and adjacent to the outboard-most reentrant corner 118 and the inboard-most reentrant corner 114. In other words, the rearward-most reentrant corner 112 is positioned between the outboard-most reentrant corner 118 and the inboard-most reentrant corner 114, and the outboard-most reentrant corner 118 and the inboard-most reentrant corner 114 are the two nearest reentrant corners to the rearward-most reentrant corner 112 of the outline. The inboard-most reentrant corner 114 is positioned between and adjacent to the forward-most reentrant corner 116 and the rearward-most reentrant corner 112.

Figure 11:
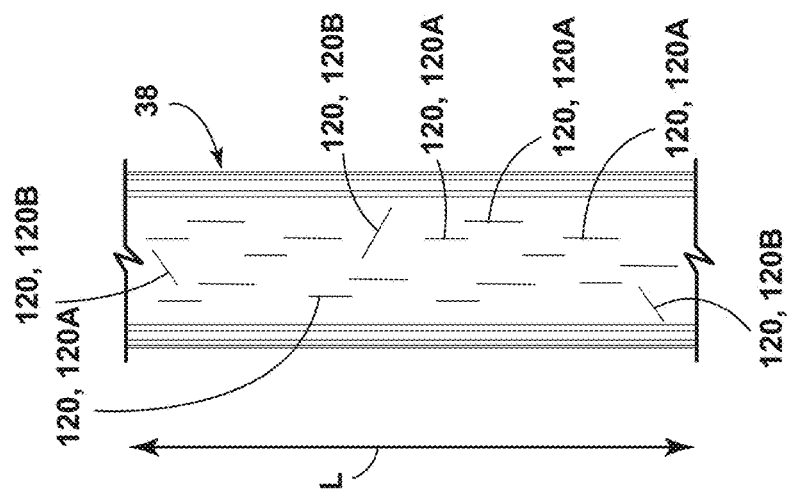
FIG. 11 is a schematic representation of area XI of the post of FIG. 10, illustrating fibers disposed within the post.

Referring now to FIGS. 10 and 11, the post 38 can be an injection-molded post 38. As such, the post 38 may be formed of a resin that is injected into a mold and cooled to form an integral component. Further, the post 38 and standoff 68 may be a single injection-molded component of the platform assembly 10. A variety of types of resins, such as thermoplastics, are contemplated. Further, a variety of types of thermoplastics are contemplated. The injection-molded post 38 may further be formed of a plurality of fibers 120 that are disposed within the resin. A variety of types of fibers 120 are contemplated. For example, the injection-molded post 38 may include one or more of a host of types of fibers 120 that may include, but is not limited to, carbon, glass, aramid, basalt, polyacrylonitrile, polyethylene terephthalate, and/or polypropylene fibers. Further, the injection-molded post 38 can include long fibers 120 and/or short fibers 120. In an exemplary embodiment, the injection-molded post 38 is formed of a thermoplastic resin and short carbon fibers 120. As such, the post 38 can be a short carbon fiber-reinforced thermoplastic post 38. Various combinations of resins and fibers 120 are contemplated.

In various embodiments, fibers 120 disposed within the post 38 and/or standoff 68 are aligned with each other and/or aligned with a given direction to enhance the structural integrity of the post 38. For example, fibers 120 disposed within the post 38 may be aligned with each other along the length L of the post 38. In an exemplary embodiment, wherein the post 38 extends from the first end 74 of the post 38 to the second end 76 of the post 38 along the length L of the post 38, the post 38 comprises a plurality of fibers 120 that includes every fiber 120 that is disposed within the post 38. The plurality of fibers 120 includes a sub-plurality of fibers 120A. Each fiber 120 in the sub-plurality of fibers 120A is elongated in a lengthwise direction of the fiber 120. Further, each fiber 120 in the sub-plurality of fibers 120A is oriented such that the lengthwise direction is substantially parallel to the length L of the post 38. In various embodiments, the plurality of fibers 120 that includes every fiber 120 that is disposed within the post 38 includes fibers 120B that are not oriented such that the lengthwise direction of the fiber 120 is substantially parallel to the length L of the post 38. For example, as illustrated in FIG. 10, there are fibers 120A that are substantially parallel relative to the length L of the post 38 and fibers 120B that are not substantially parallel relative to the length L of the post 38.

In various embodiments, the sub-plurality of fibers 120A includes a majority of the fibers 120 in the plurality of fibers 120 disposed within the post 38. In some embodiments, the sub-plurality of fibers 120A includes between about 60% and 100% of the fibers 120 in the plurality of fibers 120. In some embodiments, the sub-plurality of fibers 120A includes between about 75% and 100% of the fibers 120 in the plurality of fibers 120. In some embodiments, the sub-plurality of fibers 120A includes between about 90% and 100% of the fibers 120 in the plurality of fibers 120. In some embodiments, the sub-plurality of fibers 120A includes between about 95% and 100% of the fibers 120 in the plurality of fibers 120. In some embodiments, the sub-plurality of fibers 120A includes between about 99% and 100% of the fibers 120 in the plurality of fibers 120.

In various embodiments, fibers 120 are oriented substantially parallel to the length L of the post 38 when the lengthwise direction of the fiber 120 is angled less than about 30 degrees relative to the length L of the post 38. In some embodiments, substantially parallel to the length L of the post 38 is an angle of less than about 15 degrees relative to the length L of the post 38. In some embodiments, substantially parallel to the length L of the post 38 is an angle of less than about 10 degrees relative to the length L of the post 38. In some embodiments, substantially parallel to the length L of the post 38 is an angle of less than about 5 degrees relative to the length L of the post 38.

In some embodiments, wherein the standoff 68 is an injection-molded standoff 68, fibers 120 disposed within the at least one standoff wall 106 are aligned with each other along the length of the standoff wall 106. In an exemplary embodiment, wherein the standoff wall 106 extends generally rearward toward at least one of the teeth 50 of the standoff 68 along the length of the standoff wall 106, the standoff wall 106 comprises a plurality of fibers 120 that includes every fiber 120 that is disposed within the standoff wall 106 of the standoff 68. The plurality of fibers 120 within the standoff wall 106 includes a sub-plurality of fibers 120. Each fiber 120 in the sub-plurality of fibers 120 is elongated in the lengthwise direction of the fiber 120. Further, each fiber 120 in the sub-plurality of fibers 120 is oriented such that the lengthwise direction is substantially parallel to the length of the standoff wall 106. In various embodiments, the plurality of fibers 120 that includes every fiber 120 that is disposed within the standoff wall 106 includes fibers 120 that are not oriented such that the lengthwise direction of the fiber 120 is substantially parallel to the length of the standoff wall 106.

In various embodiments, the sub-plurality of fibers 120 includes a majority of the fibers 120 in the plurality of fibers 120 disposed within the standoff wall 106. In some embodiments, the sub-plurality of fibers 120 includes between about 60% and 100% of the fibers 120 in the plurality of fibers 120 disposed within the standoff wall 106. In some embodiments, the sub-plurality of fibers 120 includes between about 75% and 100% of the fibers 120 in the plurality of fibers 120 disposed within the standoff wall 106. In some embodiments, the sub-plurality of fibers 120 includes between about 90% and 100% of the fibers 120 in the plurality of fibers 120 disposed within the standoff wall 106. In some embodiments, the sub-plurality of fibers 120 includes between about 95% and 100% of the fibers 120 in the plurality of fibers 120 disposed within the standoff wall 106. In some embodiments, the sub-plurality of fibers 120 includes between about 99% and 100% of the fibers 120 in the plurality of fibers 120 disposed within the standoff wall 106.

In various embodiments, fibers 120 are oriented substantially parallel to the length of the standoff wall 106 when the lengthwise direction of the fiber 120 is angled less than about 30 degrees relative to the length of the standoff wall 106. In some embodiments, substantially parallel to the length of the standoff wall 106 is an angle of less than about 15 degrees relative to the length of the standoff wall 106. In some embodiments, substantially parallel to the length of the standoff wall 106 is an angle of less than about 10 degrees relative to the length of the standoff wall 106. In some embodiments, substantially parallel to the length of the standoff wall 106 is an angle of less than about 5 degrees relative to the length of the standoff wall 106.

According to an aspect of the present disclosure, a platform assembly for attachment to a tree includes a platform, an integrally formed post coupled to the platform and operable to pivot relative to the platform about a pivot axis, and a standoff extending outward from the post proximate to the first end. The post extends from a first end to a second end along a length of the post that is substantially perpendicular to the pivot axis.

According to another aspect, the post includes a front face, and at least one hook that extends outward from the front face and defines at least one receiving recess configured to receive a rope therein.

According to another aspect, the at least one receiving recess defined by the at least one hook faces generally toward the second end of the post.

According to another aspect, the at least one receiving recess defined by the at least one hook faces generally toward the first end of the post.

According to another aspect, the at least one receiving recess defined by the at least one hook includes a first receiving recess that faces generally toward the first end of the post, and a second receiving recess that faces generally toward the second end of the post.

According to another aspect, the first receiving recess faces away from the second receiving recess.

According to another aspect, the at least one hook includes a single protuberance that extends outward from the front face of the post and that defines the first and second receiving recesses.

According to another aspect, the post is an injection-molded post and includes a plurality of fibers that includes every fiber that is disposed within the post. The plurality of fibers includes a sub-plurality of fibers. Each fiber in the sub-plurality of fibers is elongated in a lengthwise direction of the fiber and oriented such that the lengthwise direction is substantially parallel to the length of the post. Further, the sub-plurality of fibers includes a majority of the fibers in the plurality of fibers.

According to another aspect, the sub-plurality of fibers includes between about 75 percent and 100 percent of the fibers in the plurality of fibers.

According to another aspect, the sub-plurality of fibers includes between about 90 percent and 100 percent of the fibers in the plurality of fibers.

According to another aspect, the standoff extending outward from the post is injection-molded and includes at least one standoff wall that extends away from the post along a length of the at least one standoff wall. The at least one standoff wall includes a plurality of fibers that includes every fiber that is disposed within the at least one standoff wall. The plurality of fibers includes a sub-plurality of fibers. Each fiber in the sub-plurality of fibers is elongated in a lengthwise direction of the fiber and oriented such that the lengthwise direction is substantially parallel to the length of the at least one standoff wall. Further, the sub-plurality of fibers includes a majority of the fibers in the plurality of fibers.

According to another aspect, the sub-plurality of fibers includes between about 75 percent and 100 percent of the fibers in the plurality of fibers.

According to another aspect, the sub-plurality of fibers includes between about 90 percent and 100 percent of the fibers in the plurality of fibers.

According to another aspect of the present disclosure, a one-piece post of a platform assembly for attachment to a tree includes a first end, a second end opposite the first end, such that a length of said post extends from the first end to the second end, a front face positioned between the first and second ends, and at least one hook that extends outward from the front face and defines at least one receiving recess configured to receive a rope therein.

According to another aspect, the at least one receiving recess defined by the at least one hook includes a first receiving recess that faces generally toward the second end of the post, and a second receiving recess that faces generally toward the first end of the post.

According to another aspect, the first receiving recess faces away from the second receiving recess.

According to another aspect, the at least one hook includes a protuberance that extends outward from the front face of the post and that defines the first and second receiving recesses.

According to yet another aspect of the present disclosure, a platform assembly for attachment to a tree includes a platform, a one-piece post coupled to the platform and operable to pivot relative to the platform about a pivot axis, and a standoff extending outward from the post proximate to the first end. The one-piece post includes a first end, a second end opposite the first end, such that a length of said post extends from the first end to the second end, a front face positioned between the first and second ends, and at least one hook that extends outward from the front face and defines at least one receiving recess configured to receive a rope therein.

According to another aspect, the at least one receiving recess defined by the at least one hook faces generally toward the second end of the post.

According to another aspect, the at least one receiving recess defined by the at least one hook faces generally toward the first end of the post.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A platform assembly for attachment to a tree, comprising:
   a platform;
   an integrally formed post coupled to the platform and operable to pivot relative to the platform about a pivot axis, the post extending from a first end to a second end along a length of the post that is substantially perpendicular to the pivot axis, wherein the post is an injection-molded post and comprises a plurality of fibers that includes every fiber that is disposed within the post, wherein the plurality of fibers includes a sub-plurality of fibers, wherein each fiber in the sub-plurality of fibers is elongated in a lengthwise direction of the fiber and oriented such that the lengthwise direction is substantially parallel to the length of the post, and wherein the sub-plurality of fibers includes a majority of the fibers in the plurality of fibers; and
   a standoff extending outward from the post proximate to the first end.

2. The platform assembly of claim 1, wherein the post comprises:
   a front face; and
   at least one hook that extends outward from the front face and defines at least one receiving recess configured to receive a rope therein.

3. The platform assembly of claim 2, wherein the at least one receiving recess defined by the at least one hook faces generally toward the second end of the post.

4. The platform assembly of claim 3, wherein the at least one receiving recess defined by the at least one hook faces generally toward the first end of the post.

5. The platform assembly of claim 4, wherein the at least one receiving recess defined by the at least one hook comprises:
   a first receiving recess that faces generally toward the first end of the post; and
   a second receiving recess that faces generally toward the second end of the post.

6. The platform assembly of claim 5, wherein the first receiving recess faces away from the second receiving recess.

7. The platform assembly of claim 5, wherein the at least one hook comprises:
   a single protuberance that extends outward from the front face of the post and that defines the first and second receiving recesses.

8. The platform assembly of claim 1, wherein the sub-plurality of fibers includes between 75 percent and 100 percent of the fibers in the plurality of fibers.

9. The platform assembly of claim 8, wherein the sub-plurality of fibers includes between 90 percent and 100 percent of the fibers in the plurality of fibers.

10. The platform assembly of claim 1, wherein the standoff extending outward from the post is injection-molded and includes at least one standoff wall that extends away from the post along a length of the at least one standoff wall, the at least one standoff wall comprising a plurality of fibers that includes every fiber that is disposed within the at least one standoff wall, wherein the plurality of fibers of the at least one standoff wall includes a sub-plurality of fibers, wherein each fiber in the sub-plurality of fibers of the at least one standoff wall is elongated in a lengthwise direction of the fiber and oriented such that the lengthwise direction is substantially parallel to the length of the at least one standoff wall, and wherein the sub-plurality of fibers of the at least one standoff wall includes a majority of the fibers in the plurality of fibers of the at least one standoff wall.

11. The platform assembly of claim 10, wherein the sub-plurality of fibers of the at least one standoff wall includes between 75 percent and 100 percent of the fibers in the plurality of fibers of the at least one standoff wall.

12. The platform assembly of claim 11, wherein the sub-plurality of fibers of the at least one standoff wall includes between 90 percent and 100 percent of the fibers in the plurality of fibers of the at least one standoff wall.

13. A one-piece post of a platform assembly for attachment to a tree, comprising:
   a first end;
   a second end opposite the first end, such that a length of said post extends from the first end to the second end;
   a front face positioned between the first and second ends and having a substantially planar portion that extends laterally from a first lateral edge to a second lateral edge for a distance that defines a lateral width of the substantially planar portion of the front face; and
   at least one hook that extends outward from the substantially planar portion of the front face and defines at least one receiving recess configured to receive a rope therein, wherein, where the at least one hook extends from the front face, the at least one hook has a lateral width that is substantially equal to the lateral width of the substantially planar portion of the front face, and wherein the substantially planar portion of the front face is interrupted by the at least one hook that extends outward therefrom, such that the substantially planar portion of the front face extends from the at least one hook toward the first end and from the at least one hook toward the second end.

14. The post of claim 13, wherein the at least one receiving recess defined by the at least one hook comprises:
   a first receiving recess that faces generally toward the second end of the post; and
   a second receiving recess that faces generally toward the first end of the post.

15. The post of claim 14, wherein the first receiving recess faces away from the second receiving recess.

16. The post of claim 14, wherein the at least one hook comprises:
   a protuberance that extends outward from the front face of the post and that defines the first and second receiving recesses.

17. A platform assembly for attachment to a tree, comprising:
   a platform;
   a one-piece post coupled to the platform and operable to pivot relative to the platform about a pivot axis, the one-piece post comprising:
      a first end;
      a second end opposite the first end, such that a length of said post extends from the first end to the second end;
      a front face positioned between the first and second ends and having a substantially planar portion that extends laterally from a first lateral edge to a second lateral edge for a distance that defines a lateral width of the substantially planar portion of the front face; and
      at least one hook that extends outward from the substantially planar portion of the front face and defines at least one receiving recess configured to receive a rope therein, wherein, where the at least one hook extends from the front face, the at least one hook has a lateral width that is substantially equal to the lateral width of the substantially planar portion of the front face, and wherein the substantially planar portion of the front face is interrupted by the at least one hook that extends outward therefrom, such that the substantially planar portion of the front face extends from the at least one hook toward the first end and from the at least one hook toward the second end; and
   a standoff extending outward from the post proximate to the first end.

18. The platform assembly of claim 17, wherein the at least one receiving recess defined by the at least one hook faces generally toward the second end of the post.

19. The platform assembly of claim 17, wherein the at least one receiving recess defined by the at least one hook faces generally toward the first end of the post.

* * * * *